G. O. BODENHOFF.
TAKE-UP MECHANISM FOR WHEELS.
APPLICATION FILED MAY 8, 1912.
1,150,989.
Patented Aug. 24, 1915.
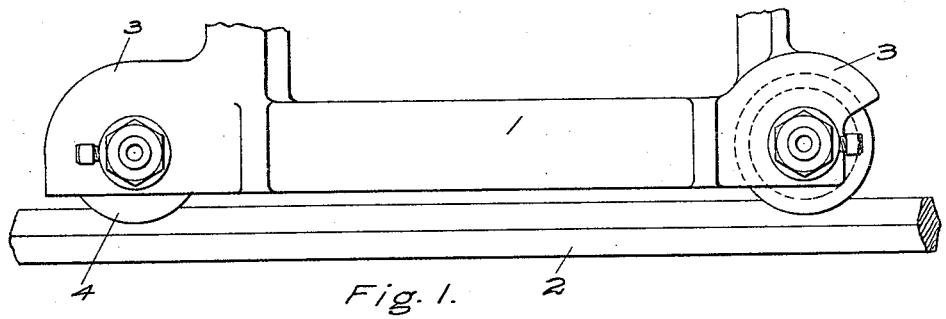
Fig. 1.
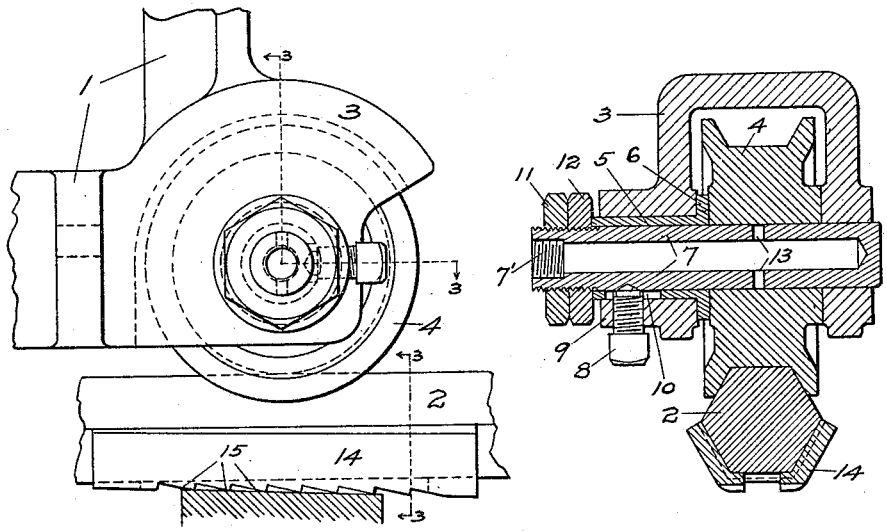
Fig. 2.
Fig. 3.
Witnesses:
J. C. Streng.
Wallace Streng
George O. Bodenhoff, Inventor,
By Fitzenberg, Atty.
COLUMBIA PLANOGRAPH CO., WASHINGTON, D. C.

UNITED STATES PATENT OFFICE.

GEORGE O. BODENHOFF, OF PORTLAND, OREGON, ASSIGNOR OF ONE-HALF TO A. J. KROENERT, OF PORTLAND, OREGON.

TAKE-UP MECHANISM FOR WHEELS.

1,150,989.

Specification of Letters Patent.

Patented Aug. 24, 1915.

Application filed May 8, 1912. Serial No. 695,906.

*To all whom it may concern:*

Be it known that I, GEORGE O. BODENHOFF, a citizen of the United States, residing in the city of Portland, county of Multnomah, and State of Oregon, have invented certain new and useful Improvements in Take-Up Mechanisms for Wheels, of which the following is a specification.

My invention relates to take-up mechanisms, and more particularly to a device adapted for use in connection with carrier wheels, pulleys and the like, in order to avoid looseness and too much play. For example, in a shingle machine, the carrier which carries the block into the saw and from which blocks the shingles are cut, must run true and steady if the shingles cut are to be uniform and regular. If there is looseness or play between the track wheels and the truck or carrier frame, the latter will have a certain amount of lateral movement and thereby cause the shingles to be cut in an irregular manner. As shingles are tapered almost to a paper edge, it is necessary that the machinery run absolutely true and without any loose motion or play. My device is adapted not only to prevent this looseness between the wheels and the carrier frame, but to provide a construction wherein the parts can be quickly and readily adjusted without any inconvenience, and without any loss of time.

In the accompanying sheet of drawings, I have illustrated one form of the application, and have shown it applied to the carrier of a shingle machine.

In the drawings, Figure 1 is a fragmentary side elevation of the lower part of a carrier frame, showing the track upon which it runs; Fig. 2 is an enlarged view of one of the carrier wheels and the wheel box of the carrier frame, with means also shown for adjusting the track in a vertical line; and Fig. 3 is a cross sectional view taken on line 3—3 of Fig. 2.

Referring now to the drawings, 1 designates the lower part of a carrier frame for carrying a block from which shingles are to be cut, and is adapted to be moved backwardly and forwardly, relative to the saw (not here shown) on a track 2. To this end it is provided with wheel boxes 3—3, within which the wheels or pulleys 4—4 are journaled. It will be noted that the wheels have an angular groove and are adapted to fit upon a track of hexagonal form in cross section, as indicated. The wheel box is of inverted U-shape, in cross section, as clearly indicated in Fig. 3, and the carrier wheel 4 is placed between the sides thereof, as shown. Before the wheel is put into place, however, I provide a sleeve 5 having a flange 6, which flanged sleeve is inserted through one side of the wheel box 3 from the inside thereof. The sleeve is short enough so that it can be inserted between the sides of the wheel box 3, and then pushed through the opening in one side thereof until it occupies the position indicated in Fig. 3. The wheel 4 is next put into place, the flange 6 of said sleeve bearing against one side of the wheel, as shown. A hollow axle 7 is next inserted through the sleeve 5, and the wheel 4, with its inner end projecting slightly through the opposite side of the wheel box 3. When once in place, the axle 7 is secured against movement by means of a set screw 8, in the bearing portion 9 of the wheel box 3. This set screw extends through a slot 10 in the sleeve 5, and engages the axles 7, as indicated in Fig. 3, holding the axle 7 against longitudinal movement, and yet permitting the sleeve 5 to be moved upon the axle 7 and against the wheel 4. This movement of the sleeve 5 is accomplished by means of two lock nuts 11—12, threaded upon the outer end of the axle 7 and adapted to be turned against the end of the sleeve 5 to move the flange thereof against the carrier wheel 4, for the purpose of taking up any play or lateral movement which the wheel 4 may have within the wheel box 3, on the axle 7.

The outer end of the hollow axle 7 is adapted to receive an oil cup (not shown), to supply oil to the interior thereof, and to this end is threaded internally as at 7'. The axle 7 is also provided with radial outlet ports 13 through which the oil or lubricant passes to the bearing surface of the wheel 4, upon the axle 7.

It will be seen from the foregoing description that any looseness or lateral movement between the wheel box and the wheel can be readily and quickly taken up by simply turning the lock nuts 11—12, to move the flanged sleeve 5 against the side of the wheel 4, the opposite side of said wheel bearing against the inside of the wheel box 3, at the opposite side thereof.

While I have shown and described but one form or embodiment of the invention, I am aware that modifications and changes can be made therein without departing from the spirit thereof, and I do not, therefore, limit the invention to the particular showing made for purposes of illustration, except as I may be limited by the hereto appended claim.

I claim:

A take-up mechanism of the character described, comprising in combination with a wheel box, a fixed axle mounted therethrough, a wheel mounted on said axle within said wheel box, a flanged sleeve mounted on said axle through one side of said wheel box with its flange bearing against the side of the wheel, a set screw through the wheel box at one side thereof for holding said axle fixed, said flanged sleeve having a slot in one side through which said set screw projects to engage said axle, whereby to permit movement of said sleeve on said axle, and lock nuts on said axle bearing against the outer end of said sleeve, whereby to move the sleeve inwardly on said axle and against said wheel, substantially as shown and described.

Signed at Portland, Oregon, April 29th, 1912.

GEORGE O. BODENHOFF.

In presence of—
A. J. KROENERT,
DANIEL E. POWERS.

Copies of this patent may be obtained for five cents each, by addressing the "Commissioner of Patents, Washington, D. C."